(12) United States Patent
Shih et al.

(10) Patent No.: US 10,182,479 B1
(45) Date of Patent: Jan. 15, 2019

(54) VOLTAGE REGULATION CIRCUIT FOR LED TUBE

(71) Applicant: Alfasemi Inc., Taipei (TW)

(72) Inventors: Te-Lung Shih, Taipei (TW); Yu-Cheng Chang, Cupertino, CA (US); Kuo-Chao Lin, Taipei (TW)

(73) Assignee: ALFASEMI INC., Taipei (TW)

( * ) Notice: Subject to any disclaimer, the term of this patent is extended or adjusted under 35 U.S.C. 154(b) by 0 days.

(21) Appl. No.: 15/885,908

(22) Filed: Feb. 1, 2018

(51) Int. Cl.
*H05B 33/08* (2006.01)

(52) U.S. Cl.
CPC ..... *H05B 33/0842* (2013.01); *H05B 33/0815* (2013.01)

(58) Field of Classification Search
None
See application file for complete search history.

(56) References Cited

U.S. PATENT DOCUMENTS 9,918,361 B1 * 3/2018 Espino ............... H05B 33/0815

* cited by examiner

*Primary Examiner* — Jany Richardson
(74) *Attorney, Agent, or Firm* — Bacon & Thomas, PLLC

(57) ABSTRACT

A voltage regulation circuit for LED tube coupled to an energy input terminal being an AC source, a CCG or a ECG, comprising: a controlling part, including: a first impedance unit coupled to the energy input terminal; a second impedance unit coupled to the first impedance unit; and a third impedance unit coupled to the second impedance unit; and a controlled part including at least an LED unit and coupled to the controlling part; wherein a first terminal of the first impedance unit is coupled to a first terminal of the second impedance unit, a second terminal of the second impedance unit is coupled to a first terminal of the third impedance unit through a node, and the node is coupled to the controlled part.

5 Claims, 4 Drawing Sheets

VOLTAGE REGULATION CIRCUIT FOR LED TUBE

BACKGROUND OF THE INVENTION

1. Field of the Invention

The present invention relates to a voltage regulation circuit and, more particularly, to a voltage regulation circuit for LED tube.

2. Description of Related Art

In recent years, Light Emitting Diode (LED) has been widely used in lighting application. Compared with a traditional fluorescent tube, an LED tube can save more power and be made in smaller size. Accordingly, the use of LED can reduce cost of power and storage space.

However, in the case of a power source being an alternative current (AC) source (e.g. which can provide an input voltage with a range from 90V to 305 V), when the power source provides an input voltage of 305 V, the internal voltage of the LED tube may reach 430V RMS, which exceeds safe operating range (e.g. from 70V to 350V RMS) of the ballast of the LED tube and thus may damage the LED tube or the ballast connected to the LED tube. Besides, there are different kinds of ballasts, such as an electrical ballast (ECG) and a magnetic ballast (CCG), which have different working characteristics. The LED tube should work with an appropriate ballast, otherwise the LED tube or the ballast may be damaged by an over-high input voltage.

Therefore, there is a need to provide a voltage regulation circuit for LED tube to solve the aforementioned problems.

SUMMARY OF THE INVENTION

An object of the present invention is to provide a voltage regulation circuit of an LED tube coupled to an energy input terminal being an AC source, a CCG or an ECG. The voltage regulation circuit of an LED tube comprises a controlling part and a controlled part. The controlling part includes a first impedance unit coupled to the energy input terminal; a second impedance unit coupled to the first impedance unit; and a third impedance unit coupled to the second impedance unit. The controlled part includes at least an LED unit coupled to the controlling part. In particular, a first terminal of the first impedance unit is coupled to a first terminal of the second impedance unit, a second terminal of the second impedance unit is coupled to a first terminal of the third impedance unit through a node, and the node is coupled to the controlled part.

In an embodiment, the first terminal of the first impedance unit is coupled to a first terminal of the energy input part through a first capacitor, a second terminal of the first impedance unit is coupled to a second terminal of the energy input terminal. In particular, when the energy input terminal provides an input voltage, the first impedance unit and the second impedance unit forms a high pass circuit or a differential circuit for filtering out a noise of the input voltage.

In an embodiment, the first terminal of the second impedance unit is coupled to the first terminal of the first impedance unit through a rectifier. In particular, the rectifier may include a diode.

In an embodiment, the second terminal of the second impedance unit is further coupled to a second capacitor. In particular, when the energy input terminal provides an input voltage, the second impedance unit and the second capacitor forms an integrator circuit or a low pass circuit for increasing a voltage at the node. Besides, the controlled part may include a switch unit, and the switch unit may be turned on when the voltage at the node is increased by the second impedance unit and the second capacitor and reaches a threshold. Furthermore, if the energy input part is provided with a negative resistance characteristic, when the switch unit is turned on, the input voltage can remain a stable voltage by a current path formed by the second impedance unit and the third impedance unit.

DETAILED DESCRIPTION OF THE PREFERRED EMBODIMENT

It is noted that, the term "coupled" hereinafter used in the present invention may be representative of "directly connected" or "indirectly connected".

Figure 1:
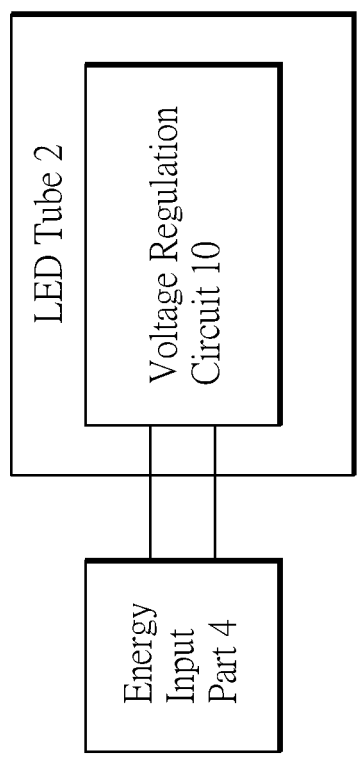
FIG. 1 is a structure diagram illustrating a voltage regulation circuit for LED according to an embodiment of the invention.

FIG. 1 is a structure diagram illustrating a voltage regulation circuit 10 for LED tube 2 according to an embodiment of the invention. The voltage regulation circuit 10 can be disposed in an LED tube 2, and can be coupled to an energy input part 4. In an embodiment, the energy input part 4 can be an AC source, a magnetic ballast (CCG) or an electrical ballast (ECG). In other words, an AC source, a CCG and an ECG may be applied to the LED tube 2 provided with the voltage regulation circuit 10 according to the invention.

Figure 2:
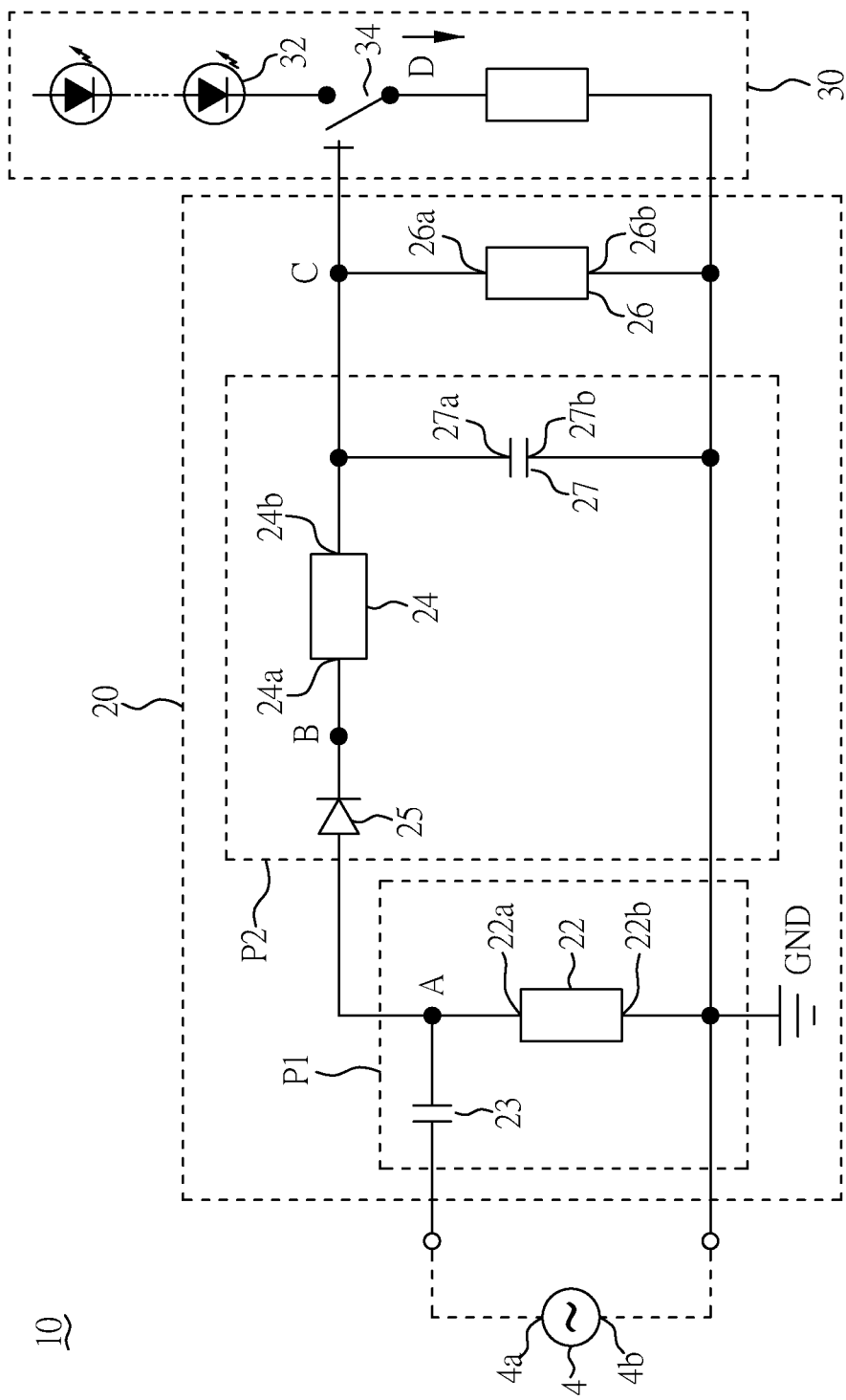
FIG. 2 is a circuit diagram illustrating a voltage regulation circuit for LED according to an embodiment of the invention.

FIG. 2 is a circuit diagram illustrating a voltage regulation circuit 10 for LED according to an embodiment of the invention. As shown in FIG. 2, the voltage regulation circuit 10 includes a controlling part 20 and a controlled part 30. The controlling part 20 includes a first impedance unit 22, a second impedance unit 24 and a third impedance unit 26. In an embodiment, the first impedance unit 22, the second impedance unit 24 and the third impedance unit 26 is preferably but not limited to a resistor. (To clearly describe the invention, the impedance units are presented as resistors in the following examples) The controlled part 30 includes at least one LED unit 32. The first resistor 22 is coupled to the energy input part 4. The second resistor 24 is coupled to the first resistor 22. The third resistor 26 is coupled to the second resistor 24. The controlled part 30 is coupled to the controlling part 20. The first resistor 22 has a first terminal 22a and a second terminal 22b. The second resistor 24 has a first terminal 24a and a second terminal 24b. The third resistor 26 has a first terminal 26a and a second terminal 26b. In particular, the first terminal 22a of the first resistor 22 is coupled to the first terminal 24a of the second resistor 24, the second terminal 24b of the second resistor 24 is coupled to the first terminal 26a of the third resistor 26 through a node C, and the node C is coupled to the controlled part 30.

In an embodiment, the first terminal 22a of the first resistor 22 is coupled to a first terminal 4a of the energy input part 4 through a first capacitor 23, and the second terminal 22b of the first resistor 22 is coupled to a second terminal 4b of the energy input part 4 and a ground terminal GND. In an embodiment, the second terminal 22b of the first resistor 22 is directly connected to the second terminal 4b of the energy input part 4, which is not meant to be limiting. In an embodiment, the first resistor 22 and the first capacitor 23 forms a differential circuit or a high pass circuit (P1), which is not meant to be limiting. When the first resistor 22 and the first capacitor 23 forms the differential circuit or the high pass circuit (P1), a noise of an energy (e.g. an input voltage) inputted by the energy input part 4 can be filtered out by the differential circuit or the high pass circuit (P1).

In an embodiment, the first terminal 22a of the first resistor 22 is coupled to the first terminal 24a of the second resistor 24 through a rectifier 25. The first terminal 22a of the first resistor 22, a terminal of the first capacitor 23 and a terminal of the rectifier 25 can be coupled to each other at a node A. The rectifier 25 can be implemented by a diode, e.g. the rectifier 25 can include at least a diode, which is not meant to be limiting. In an embodiment, when the rectifier 25 is implemented by the diode, the first terminal 22a of the first resistor 22 can be directly connected to an anode of the rectifier 25, and a cathode of the rectifier 25 can be directly connected to the first terminal 24a of the second resistor 24, which are not meant to be limiting. The rectifier 25 can rectify the input voltage provided by the energy input part 4, and the AC voltage can be rectified to a DC voltage.

In an embodiment, the second terminal 24b of the second resistor 24 is coupled to a second capacitor 27. The second capacitor 27 has a first terminal 27a and a second terminal 27b. In an embodiment, the second terminal 24b of the second resistor 24 is coupled to the first terminal 27a of the second capacitor 27, and the second terminal 27b of the second capacitor 27 is coupled to the second terminal 22b of the first resistor 22 and the ground terminal GND, which are not meant to be limiting. In an embodiment, the second resistor 24 and the second capacitor 27 can form an integral circuit or a low pass circuit (P2), which is not meant to be limiting. When the second resistor 24 and the second capacitor 27 form the integral circuit or the low pass circuit (P2), the input voltage can be rectified by the rectifier 25, and then be raised by the integral circuit or the low pass circuit (P2).

In an embodiment, the controlled part 30 includes a switch unit 34 coupled to the first node NI. The switch unit 34 has a first terminal 34a, a second terminal 34b and a third terminal 34c. The first terminal 34a of the switch unit 34 is coupled to the at least one LED unit 32, and the second terminal 34b is coupled to the second terminal 26b of the third resistor 26, and the third terminal 34c of the switch unit 34 is coupled to the second terminal 24b of the second resistor 24 and the first terminal 27a of the second capacitor 27 through the first node NI. In an embodiment, the switch unit 34 can be controlled according to a threshold, e.g. when the input voltage at the third terminal 34a of the switch unit 34 reaches the threshold, the switch unit 34 is turned on, and a current path to the LED unit 32 is formed for the LED unit 32 to emit light, which are not meant to be limiting.

In an embodiment, the second terminal 27b of the second capacitor 27 is coupled to the ground terminal GND, and the second terminal 26b of the third resistor 26 is coupled to the ground terminal GND, which are not meant to be limiting. In an embodiment, the controlled part 30 further includes a loading unit 36. In an embodiment, the second terminal 34b of the switch unit 34 is coupled to the ground terminal GND through the loading unit 36, which is not meant to be limiting. The loading unit 36 can include a resistor or other electronic units, or the loading unit 36 can be implemented by a resistor or other electronic components.

The operation according to the invention will be discussed in the following description with reference to FIGS. 1 to 4.

Figure 3:
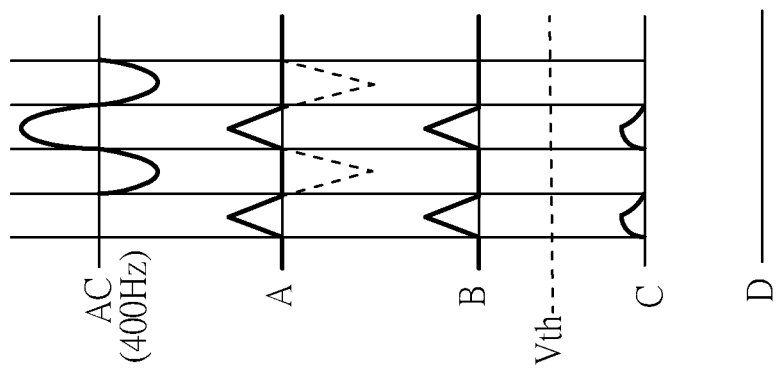
FIG. 3 is a schematic diagram illustrating an operation of the voltage regulation circuit according to an embodiment of the invention.

FIG. 3 is a schematic diagram illustrating an operation of the voltage regulation circuit 10 according to an embodiment of the invention. In this embodiment, the energy input part 4 is the AC source or the CCG. Based on the operation characteristics of the AC source and the CCG, the AC source or the CCG operates in a low frequency which is preferably but not limited to be smaller than 400 Hz.

With reference to FIGS. 1 to 3, since the AC source and the CCG both operates in low frequency, at a moment when the LED tube 2 is initially powered on, the input voltage in low frequency provided by the AC source or the CCG is filtered out by the high pass circuit or the differential circuit (P1) formed by the first capacitor 23 and the first resistor 22. Therefore, there is almost no voltage or only a extremity low voltage in the node A and node B, and even though the voltage at the node B may be raised by the low pass circuit or the integral circuit (P2) formed by the second resistor 24 and the second capacitor 27, it however cannot reach the threshold Vth of the switch unit 34 of the controlled part 30, so that the switch unit 34 remains turned off. In this way, even though the AC source or the CCG provides the over-high input voltage at the moment when the LED tube 2 is initially powered on, the switch unit 34 remains turned off, and there is no current flowing through the at least one LED unit 32. Thus, at the moment when the LED tube 2 is initially powered on, the driving units (e.g. LED unit 32, the CCG . . . etc.) may not be damaged by the over-high input voltage.

Figure 4:
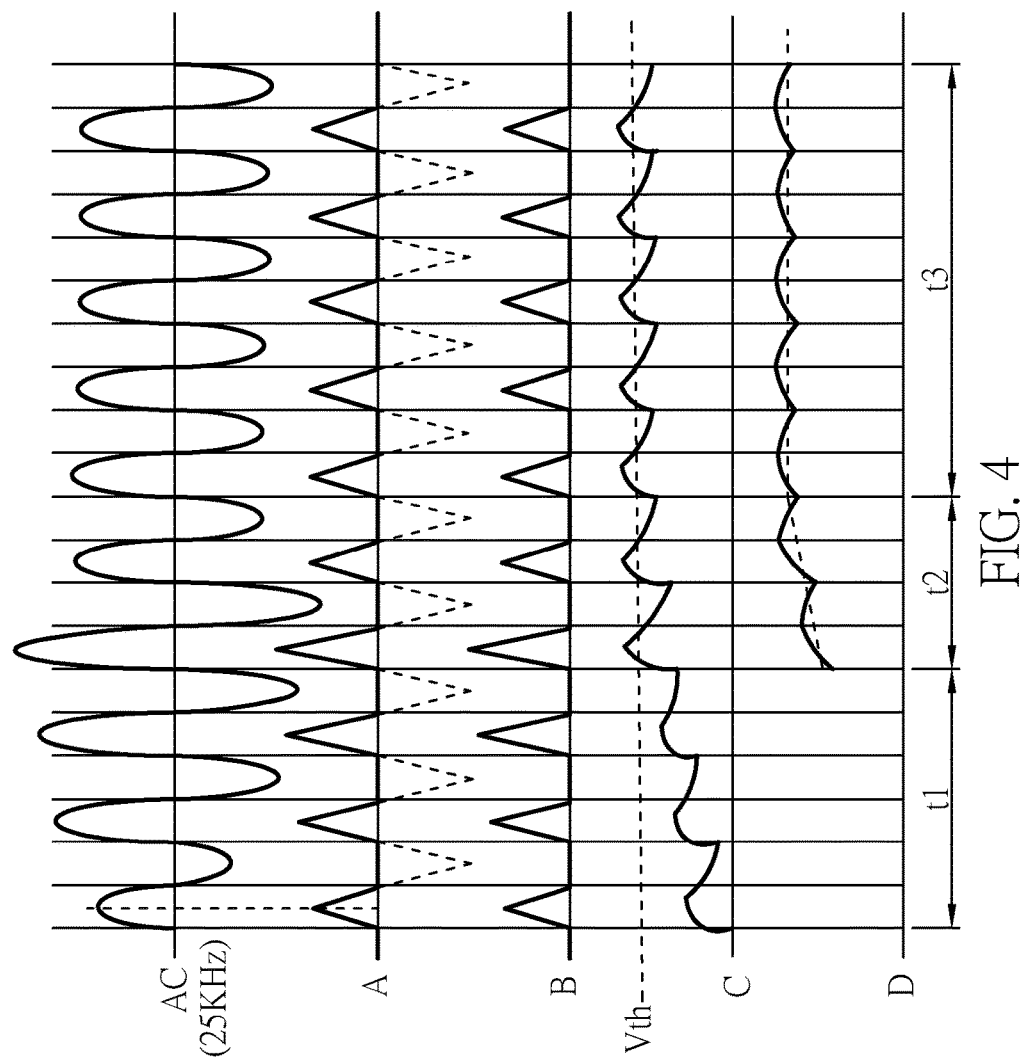
FIG. 4 is a schematic diagram illustrating an operation of the voltage regulation circuit according to another embodiment of the invention.

FIG. 4 is a schematic diagram illustrating an operation of the voltage regulation circuit 10 according to another embodiment of the invention. In this embodiment, the energy input part 4 is the ECG. Based on the characteristics of the ECG, the ECG operates in a high frequency which is preferably but not limited to be greater than 25 KHz.

With reference to FIGS. 1 and 4, since the ECG works in high frequency, the input voltage in high frequency provided by the ECG is not filtered out by the high pass circuit or the differential circuit (P1) formed by the first capacitor 23 and the first resistor 22.

As shown in FIG. 4, in a period t1, a voltage at the node A and a voltage at the node B are increased following the input voltage provided by the energy input part 4. Besides, the voltage can be transformed from AC mode to DC mode by the rectifier 25, e.g. the voltage at the node A is AC mode, and the voltage at the node B becomes DC mode. In addition, a voltage at the node C is gradually increased during the operation of the integral circuit or the low pass circuit (P2) formed by the second resistor 24 and the second capacitor 27. In an embodiment, the input voltage provided by the energy input part 4 is gradually increased in the period t1 as well.

In a period t2, the input voltage provided by the energy input part 4 is increased to a high voltage, and the voltage at the node C reaches the threshold Vth of the switch unit 34 (i.e. the voltage at the node C≥Vth), so that the switch unit 34 is turned on. When the switch unit 34 is turned on, the current path to the LED unit 32 can be formed, and thus a current can flow through the node D.

In a period t3, in addition to the current path to the LED unit 32, the current path to the third resistor R3 is also formed, the total current of the voltage regulation circuit 10 is increased. And when the total current of the voltage regulation circuit 10 is increased, the input voltage provided by the ECG is decreased because the input voltage of the energy input part 4 (i.e. the ECG) is affected by the negative resistance characteristic. Thus, in the period t3, the input voltage provided by the energy input part 4 can be decreased to a stable voltage rather than an over-high voltage. Correspondingly, the voltages at the node C and the node D can remain stable rather than being increased. It is noted that, the invention allows that the input voltage remains a stable voltage when the switch unit 34 is turned on, and avoids an over-high voltage occurring in the LED tube 2, thereby improving the safety of the LED tube 2 and the ECG.

In an embodiment, the voltage at the node C can be changed by adjusting the ratio of the second resistor. R2 to the third resistor R3. In an embodiment, when the third resistor R3 is removed, the voltage at the node C is doubled or more (and thus the input voltage is also increased), which is not meant to be limiting.

In conclusion, according to the invention, in the case that the energy input part 4 is the AC source or the CCG, the input voltage (in low frequency) can be filtered out by the high pass circuit (part 1) formed by the first resistor 22 and the first capacitor 23 regardless of its voltage level, so that the input voltage does not affect the LED tube 2 even though it is over-high. And in the case that the energy input part 4 is the ECG, the current flowing through the current path to the third resistor 26 can be controlled by adjusting the ratio of the resistance of the second resistor 24 to the third resistor 26, so that when the switch unit 34 is turned on, the input voltage can be decreased to the stable voltage, thereby avoiding the problem caused by the over-high voltage.

Although the present invention has been explained in relation to its preferred embodiments, it is to be understood that many other possible modifications and variations can be made without departing from the spirit and scope of the invention as hereinafter claimed.

What is claimed is:

1. A voltage regulation circuit for LED tube coupled to an energy input terminal being an AC source, a CCG or an ECG, comprising:
   a controlling part, including:
   a first impedance unit coupled to the energy input terminal;
   a second impedance unit coupled to the first impedance unit; and
   a third impedance unit coupled to the second impedance unit; and
   a controlled part including at least an LED unit and coupled to the controlling part;
   wherein a first terminal of the first impedance unit is coupled to a first terminal of the second impedance unit, a second terminal of the second impedance unit is coupled to a first terminal of the third impedance unit through a node, and the node is coupled to the controlled part,
   wherein the second terminal of the second impedance unit is coupled to a second capacitor,
   wherein, when the energy input terminal provides an input voltage, the second impedance unit and the second capacitor form an integrator circuit or a low pass circuit for increasing a voltage at the node,
   wherein the controlled part includes a switch unit coupled to the node,
   wherein the switch unit is turned on when the voltage at the node is increased by the second impedance unit and the second capacitor and reaches a threshold, and
   wherein if the energy input terminal is provided with a negative resistance characteristic, when the switch unit is turned on, the input voltage remains a stable voltage by a current path formed by the second impedance unit and the third impedance unit.

2. The voltage regulation circuit for LED tube of claim 1, wherein the first terminal of the first impedance unit is coupled to a first terminal of the energy input terminal through a first capacitor, a second terminal of the first impedance unit is coupled to a second terminal of the energy input terminal.

3. The voltage regulation circuit for LED tube of claim 1, wherein, when the energy input terminal provides an input voltage, the first impedance unit and the second impedance unit form a high pass circuit or a differential circuit for filtering out an noise of the input voltage.

4. The voltage regulation circuit for LED tube of claim 1, wherein the first terminal of the second impedance unit is coupled to the first terminal of the first impedance unit through a rectifier.

5. The voltage regulation circuit for LED tube of claim 4, wherein the rectifier includes a diode.

* * * * *